Dec. 23, 1930.　　　V. S. ALEXANDER　　　1,785,725
RAILWAY TRAFFIC CONTROLLING APPARATUS
Filed May 17, 1930
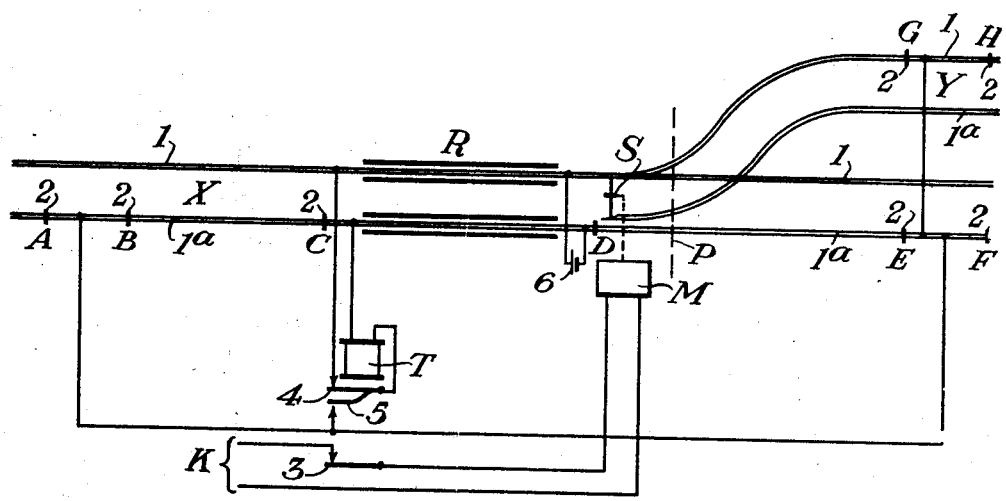
INVENTOR:
V. S. Alexander,
by A. L. Vincill
His attorney Patented Dec. 23, 1930

1,785,725

UNITED STATES PATENT OFFICE

VINCENT S. ALEXANDER, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY-TRAFFIC-CONTROLLING APPARATUS

Application filed May 17, 1930. Serial No. 453,358.

My invention relates to railway traffic controlling apparatus, and particularly to track circuits for the control of traffic governing devices.

One feature of my invention is the provision of novel and improved means for preventing wrong operation of a track relay in the event of failure of a vehicle to maintain a shunt across the track rails while occupying the section to which the relay is connected.

I will describe one form of apparatus embodying my invention, and will then point out the novel features thereof in claims.

The accompanying drawing is a diagrammatic view showing one form of apparatus embodying my invention.

Referring to the drawing, the reference characters 1 and $1^a$ designate the track rails of a stretch of railway track X, the rail $1^a$ of which is divided by insulated joints 2 into a plurality of sections herein shown as a first pick-up section A—B, a main or intermediate section C—D, and a second pick-up section E—F. A switch S is located between the sections C—D and E—F, and connects the track X with a side track Y, the rail 1 of which is also divided by insulated joints 2 to provide a single pick-up section G—H. A car retarder R is located in the section C—D for decreasing the speed of a car approaching the switch S from the left.

The switch S is moved by an operating mechanism M which is controlled from a remote point through the medium of a circuit K which includes a front contact 3 of a track relay T. Track relay T is connected across the rails 1 and $1^a$ adjacent one end of section C—D, and is supplied with current from a battery 6 connected across the rails 1 and $1^a$ adjacent the other end of this section. One terminal of relay T is constantly connected with rail $1^a$. The other terminal of relay T is at times connected with the rail 1 through a front contact 4 of this relay, and at other times is connected with the rail $1^a$ of both of the sections A—B and E—F through a back contact 5 of relay T. Contacts 4 and 5 together constitute what is termed a "make before break" contact; that is, they are arranged so that, when realy T becomes energized, front contact 4 thereof will close before back contact 5 opens and, conversely, when this relay becomes deenergized, back contact 5 will close before front contact 4 opens.

The distance between the end B of section A—B and the left-hand end of retarder R is sufficient to insure that the rear truck of an eastbound car, that is, of a car moving toward the right as shown in the drawing, will depart entirely from section A—B before its front truck engages retarder R. Also, the left-hand end of section E—F is located at a sufficient distance beyond switch S to insure that, before the front truck of an eastbound car enters section E—F, the rear truck of the car will pass a point indicated in the drawing by the broken line P, and will so permit switch S to be operated with safety.

I will now assume that section C—D is unoccupied, and that relay T is therefore energized by virtue of a stick circuit which passes from one terminal of battery 6, through rail 1, front contact 4 of relay T, winding of relay T, and rail $1^a$ to the other terminal of battery 6. Under these conditions, the front contact 3 of relay T is closed, thereby completing circuit K for switch operating mechanism M so that switch S may be operated.

If an eastbound car should now enter section C—D, the wheels and axles of its front truck will immediately shunt relay T and cause it to open its front contact 3, and this will open the circuit K which controls switch operating mechanism M. The deenergization of relay T also causes it to close its back contact 5 and to subsequently open its front contact 4. The stick circuit previously traced for relay T through contact 4 is therefore interrupted, and cannot be reestablished if the wheels of the car should become elevated from the rails of track X by the braking action of retarder R.

The operation of the apparatus for a westbound car is substantially the same as that described for an eastbound car. In this case, relay T will become deenergized when the front truck of a westbound car enters section C—D, and will become reenergized by a pick-up circuit established through back contact 5 as soon as the front truck of the car enters section A—B. It will therefore be noted that sections A—B, E—F, and G—H are, in effect, pick-up sections for relay T, and consequently need be of a length sufficient only to maintain contact with the wheels of the car until relay T has had time to operate.

From the foregoing, it will be apparent that when relay T is once deenergized by the front truck of a car, it cannot be reenergized until the front truck enters section E—F, G—H or A—B even though the wheels of the car may be lifted from engagement with the track rails by the car retarder while the car is in section C—D. It follows that switch S cannot be operated until the rear truck of an eastbound car passes the safety point P or until the rear truck of a westbound car leaves retarder R, thus eliminating the possibility of switch S being operated either in front of or beneath a car.

Although I have herein shown and described only one form of railway traffic controlling apparatus embodying my invention, it is understood that various changes and modifications may be made therein within the scope of the appended claims without departing from the spirit and scope of my invention.

Having thus described my invention, what I claim is:

1. In combination, a stretch of railway track, one rail of which is divided by insulated joints to form a main section and at least one pick-up section, a track relay having a front and a back contact so adjusted that when the relay becomes energized the back contact does not open until after the front contact has closed, one terminal of the winding of said relay being connected with the divided track rail of said main section, means for connecting the other terminal with the undivided rail through said front contact or with the divided rail of the pick-up section through said back contact, and a source of current connected across the undivided rail and the divided rail of the main section.

2. In combination, a stretch of railway track divided into a plurality of sections, a traffic governing device for controlling traffic movements over said stretch, a track relay, means controlled by said relay for controlling the operation of said governing device, a pick-up circuit for said relay including a rail of one of said sections and a back contact of said relay, and a stick circuit for said relay including a rail of another of said sections and a front contact of said relay.

3. In combination, a stretch of railway track divided into a plurality of sections, a traffic governing device for controlling traffic movements over said stretch, a track relay provided with a make-before-break contact device for controlling the operation of said governing device, a pick-up circuit for said relay including a rail of one of said sections and a back contact of said contact device, and a stick circuit for said relay including a rail of another of said sections and a front contact of said contact device.

4. In combination, a stretch of railway track divided into two pick-up sections and an intermediate main section, a traffic governing device for controlling traffic movements over said stretch, a track relay for controlling the operation of said governing device, a pick-up circuit for said relay including a rail of one of said pick-up sections and a back contact of said relay, a second pick-up circuit for said relay including a rail of the other of said pick-up sections, and a stick circuit for said relay including a rail of said intermediate section and a front contact of said relay.

5. In combination, a stretch of railway track divided into a main section and a plurality of pick-up sections, a railway switch, a track relay having a make-before-break contact device for controlling the operation of said switch, a pick-up circuit for said relay including a rail of one of said pick-up sections and a back contact of said contact device, and a stick circuit for said relay including a rail of said main section and a front contact of said contact device.

6. In combination, a stretch of railway track divided into a pick-up section and an intermediate section, a traffic governing device for controlling traffic movements over said stretch, a relay for controlling the operation of said governing device, and having a front contact and a back contact, said front contact being arranged to close before said back contact opens and said back contact being arranged to close before said front contacts open, a pick-up circuit for said relay including one rail of one of said pick-up sections, the back contact of said relay and the same rail of said main section, and a stick circuit for said relay including both rails of said main section and the front contact of said relay.

7. In combination, a stretch of railway track comprising a rail 1 and a rail 1$^a$ divided into a plurality of pick-up sections and an intermediate section, a traffic governing device for controlling traffic movements over said stretch, a relay for controlling the operation of said governing device, and having a front contact and a back contact, said front contact being arranged to close before said back contact opens and said back contact being arranged to close before said front contacts open, a pick-up circuit for said relay including the rail 1$^a$ of one of said pick-up sections, the back contact of said relay and the rail 1$^a$ of said main section, and a stick circuit for said relay including rails 1 and 1ª of said main section and the front contact of said relay.

8. In combination, a stretch of railway track comprising a rail 1 and a rail 1ª divided into two pick-up sections and an intermediate section, a traffic governing device for controlling traffic movements over said stretch, a relay for controlling the operation of said governing device, and having a front contact and a back contact, said front contact being arranged to close before said back contact opens and said back contact being arranged to close before said front contacts open, two pick-up circuits for said relay each including the rail 1ª of one of said pick-up sections, the back contact of said relay and the rail 1ª of said main section, and a stick circuit for said relay including rails 1 and 1ª of said main section and the front contact of said relay.

9. In combination, a stretch of railway track comprising a rail 1 and a rail 1ª divided into two pick-up sections and an intermediate section, a traffic governing device for controlling traffic movements over said stretch, a relay for controlling the operation of said governing device, and having a front contact and a back contact, said front contact being arranged to close before said back contact opens and said back contact being arranged to close before said front contacts open, a first pick-up circuit for said relay including the rail 1ª of one of said pick-up sections, the back contact of said relay and the rail 1ª of said main section, a second pick-up circuit for said relay including the rail 1ª of the other of said pick-up sections, the back contact of said relay and the rail 1ª of said main section, and a stick circuit for said relay including the rails 1 and 1ª of said main section and the front contact of said relay.

In testimony whereof I affix my signature.

VINCENT S. ALEXANDER.